United States Patent
Kohno et al.

(10) Patent No.: US 6,845,335 B2
(45) Date of Patent: Jan. 18, 2005

(54) AUTOMATIC TEST VECTOR GENERATION METHOD, TEST METHOD MAKING USE OF THE TEST VECTORS AS AUTOMATICALLY GENERATED, CHIP MANUFACTURING METHOD AND AUTOMATIC TEST VECTOR GENERATION PROGRAM

(75) Inventors: Kazuyoshi Kohno, Kanagawa-ken (JP); Hironori Uetani, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 44 days.

(21) Appl. No.: 10/391,750

(22) Filed: Mar. 20, 2003

(65) Prior Publication Data

US 2003/0195715 A1 Oct. 16, 2003

Related U.S. Application Data

(62) Division of application No. 09/749,548, filed on Dec. 28, 2000, now Pat. No. 6,611,779.

(30) Foreign Application Priority Data

Dec. 28, 1999 (JP) .......................................... 11-375860

(51) Int. Cl.$^7$ .............................................. G06F 19/00
(52) U.S. Cl. .................................................... 702/117
(58) Field of Search ............................ 702/117, 182, 702/23; 710/15, 72; 703/28; 324/121, 771, 765; 341/120; 714/30, 36, 738

(56) References Cited

U.S. PATENT DOCUMENTS 4,652,992 A * 3/1987 Mensch, Jr. ................. 716/17
6,115,763 A * 9/2000 Douskey et al. ............. 710/72

* cited by examiner

Primary Examiner—John Barlow
Assistant Examiner—Tung Lau
(74) Attorney, Agent, or Firm—Oblon, Spivak, McClelland, Maier & Neustadt, PC

(57) ABSTRACT

A technique for automatically generating test vectors comprises an ISA specification analysis step of analyzing specifications of an instruction set architecture (ISA) of a processor (S101); a test vector generation data preparation step of preparing data required for generating test vectors (S103); and a test vector generation step of generating test vectors by the use of said data (S105).

12 Claims, 8 Drawing Sheets

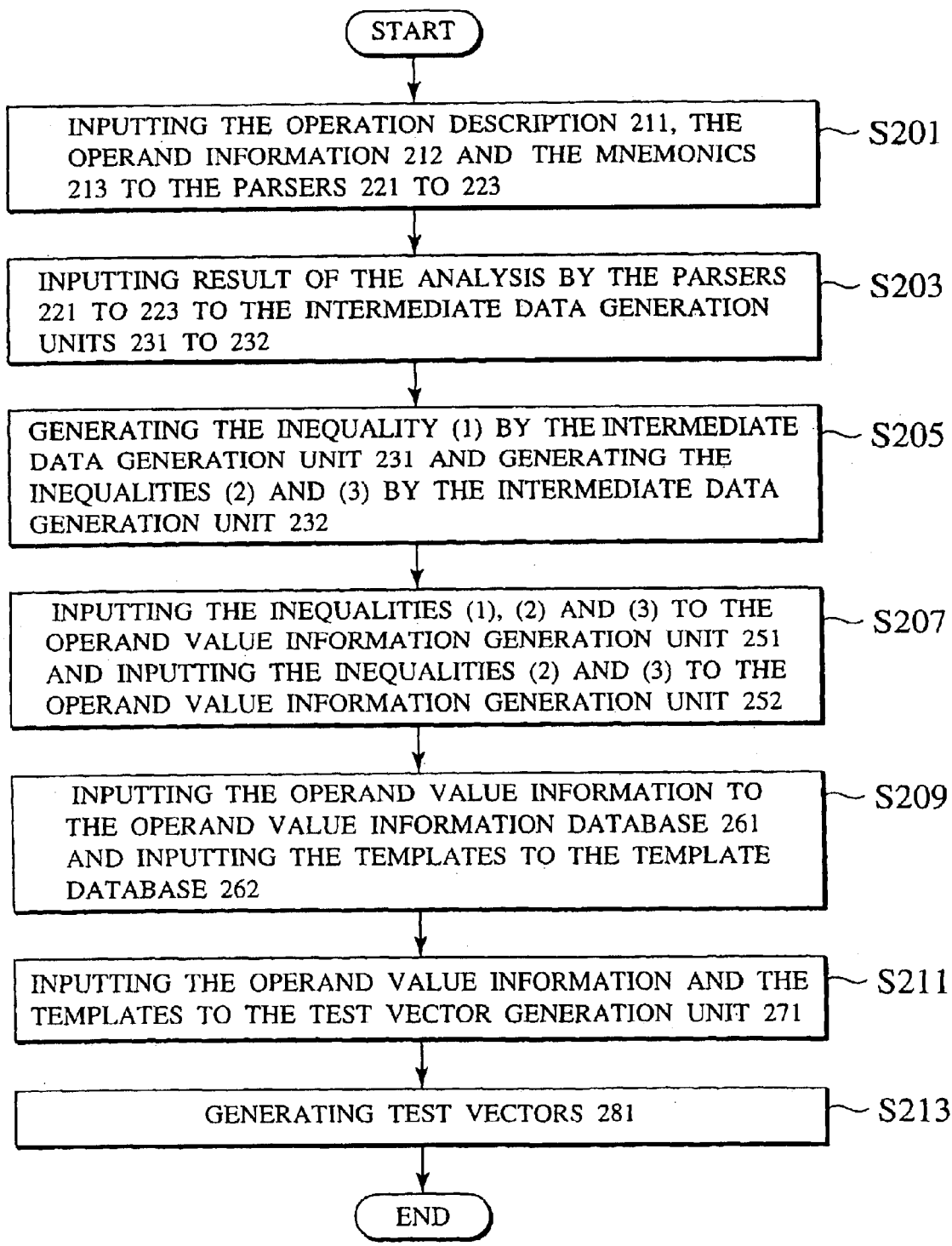

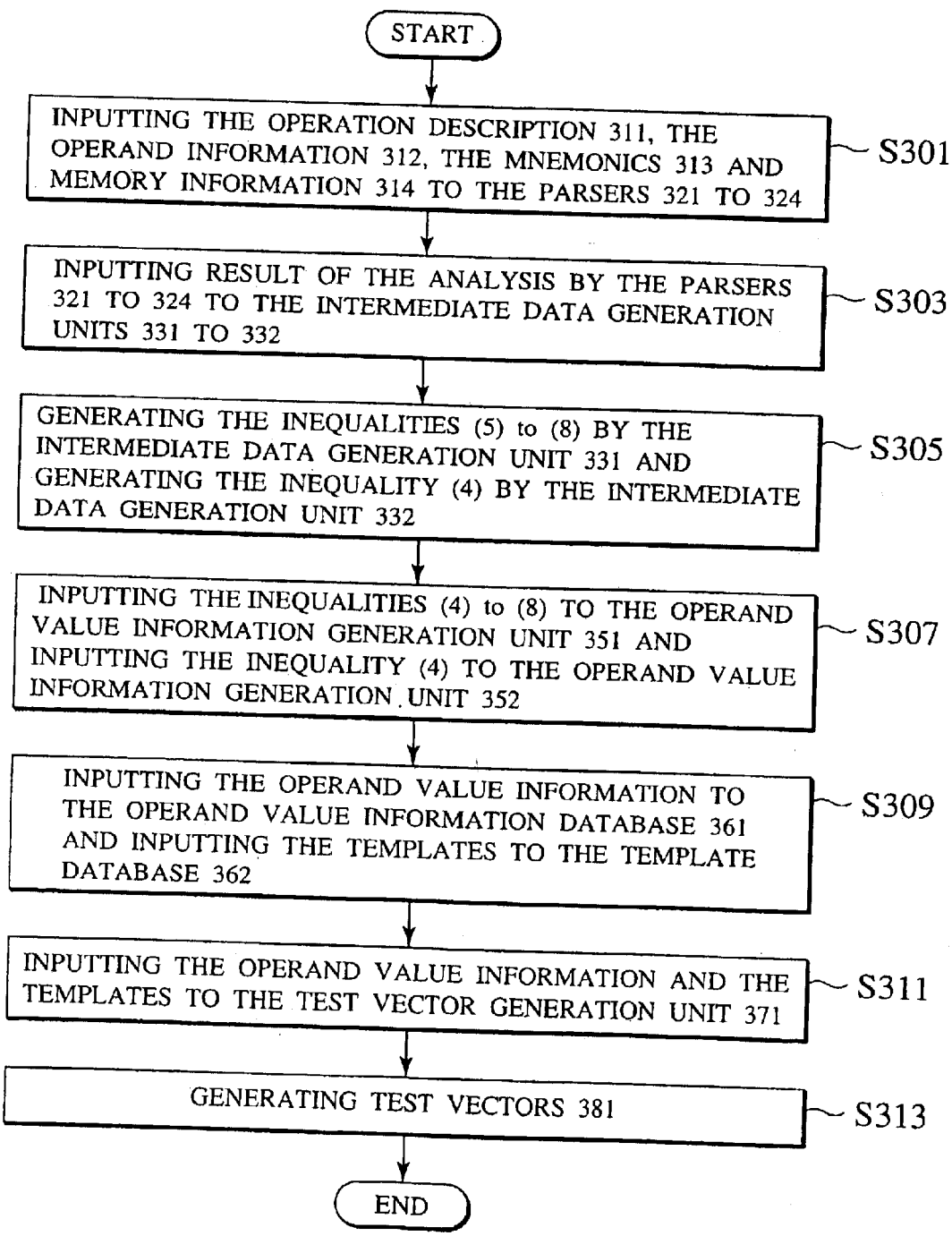

AUTOMATIC TEST VECTOR GENERATION METHOD, TEST METHOD MAKING USE OF THE TEST VECTORS AS AUTOMATICALLY GENERATED, CHIP MANUFACTURING METHOD AND AUTOMATIC TEST VECTOR GENERATION PROGRAM

CROSS-REFERENCE TO RELATED APPLICATIONS

This application is based upon and claims the benefit of priority from the prior Japanese Patent Application No. 11-375860, filed Dec. 28, 1999; the entire contents of which are incorporated herein by reference.

BACKGROUND OF THE INVENTION

1. Field of the Invention

The present invention is related to a test vector generation method and a program for automatically generating test vectors for use in testing whether or not instructions are implemented in a processor in agreement with the predetermined specifications of the instruction set architecture (ISA), and a test method and a chip manufacturing method making use of the test vectors as generated by the test vector generation method.

2. Description of the Related Art

In the past, the operation of a processor has been tested to confirm implementation of instructions in the processor in agreement with the predetermined specification, for example, (1) by manually preselecting a variety of combinations of operand values and handcoding test vectors with the combinations, or (2) by automatically generating combinations of operand values at random and then generating test vectors with the combinations. However, in accordance with the above described method (1), a considerable time is required for generating test vectors. On the other hand, in accordance with the above described method (2), a considerable time is required for completing a test program because the reliability of test program must be enhanced by making use of a large number of combinations of test vectors while each combination can be easily generated.

SUMMARY OF THE INVENTION

It is an object of the present invention to provide a method and a program for automatically generating test vectors with which a reliable test can be completed within a short time, and a test method and a chip manufacturing method making use of the test vectors as generated by the test vector generation method.

In order to accomplish the objects as described above, in accordance with the first feature of the present invention, a method for automatically generating test vectors for use in testing a processor as to whether or not instructions in the processor are implemented in agreement with the predetermined specifications includes an ISA specification analysis step of analyzing specifications of an instruction set architecture (ISA) of the processor; a test vector generation data preparation step of preparing data required for generating test vectors; and a test vector generation step of generating test vectors by the use of said data.

The ISA specification analysis step includes a step of determining conditions, which the set of the source operands and the result of execution of an instruction must satisfy in order not to invoke an exception of the processor under test, by the use of operand information, operation description and mnemonics. The test vector generation data preparation step includes a step of generating a set of source operand values satisfying both the two conditions of the condition which the set of the source operands must satisfy and the condition which the result of execution of an instruction must satisfy. The test vector generation step may include a step of expanding the instruction under test with an argument of source operand values satisfying said two conditions.

It is possible to separately test the operation of a respective instruction itself by automatically generating operand values which invoke no exception.

The ISA specification analysis step may include a step of analyzing a conditional expression to be satisfied by operand values as input or satisfied by the result of the execution of an instruction in order to confirm if the conditional expression can inherently not be TRUE or can inherently not be FALSE.

It is therefore possible to detect a bug in the ISA specifications by analyzing a conditional expression in order to confirm if the conditional expression can inherently not be TRUE or can inherently not be FALSE.

The test vector generation method may further include a compare instruction sequence adding step of generating an expected value to be output when the processor under test performs a correct operation and adding an instruction sequence for comparing said expected value to the output value as actually output from the processor under test.

It is possible to test the circuit on the register transfer level (RTL) even without an instruction level simulator by comparing the expected value with the value as actually output.

The test vector generation method may further include an execution instruction counting step of counting, in the case that an instruction to be tested is a branch instruction, the number of instructions to be executed if the branch is not taken and the number of instructions to be executed if the branch is taken; a taken/not taken branch counting step of counting, among from sets of the source operand values satisfying said two conditions, the number of sets of the source operand values with which the branch is not taken and the number of sets of the source operand values with which the branch is taken; and a step of obtaining the sum of the product of the number of instructions to be executed if the branch is not taken and the number of sets of the source operand values with which the branch is not taken and the product of the number of instructions to be executed if the branch is taken and the number of sets of the source operand values with which the branch is taken.

The estimation of the time required for executing test vectors becomes possible by calculating the number of cases that the branch is not taken and the number of instructions to be executed when the branch is not taken and, in the same manner, calculating the number of cases that the branch is taken and the number of instructions to be executed when the branch is taken.

BRIEF DESCRIPTION OF THE DRAWINGS

FIG. 3 is a flowchart showing the procedure in accordance with the method of automatically generating test vectors of the first embodiment.

FIG. 6 is a flowchart showing the procedure in accordance with the method of automatically generating test vectors of the second embodiment.

DETAILED DESCRIPTION OF THE PREFERRED EMBODIMENTS

In the following description, several embodiments of the present invention will be explained.

Figure 1:
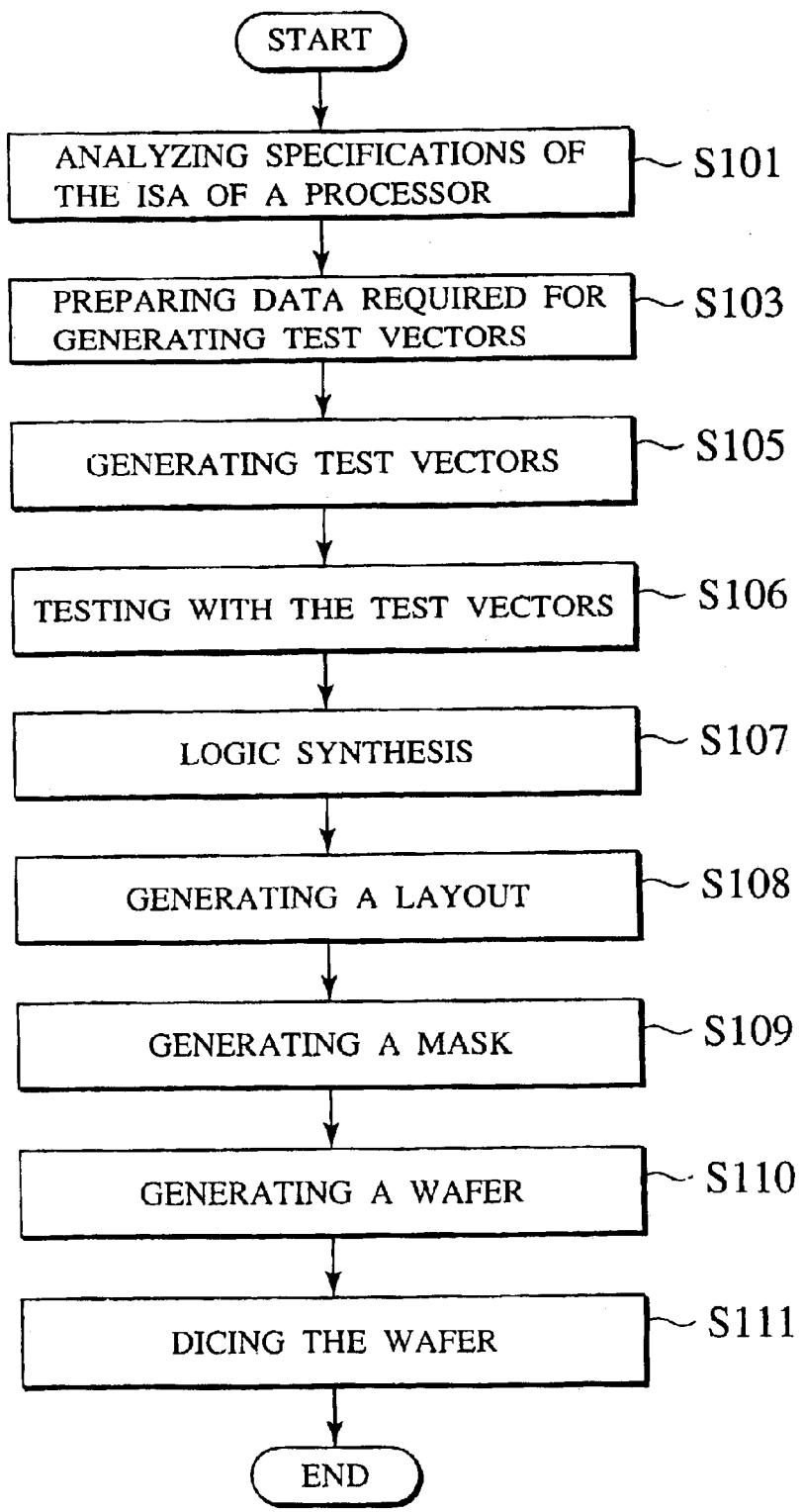
FIG. 1 is a flowchart showing the procedure in accordance with a method of automatically generating test vectors of the present invention.

FIG. 1 is a flowchart showing the procedure in accordance with a method of automatically generating test vectors of the present invention. As illustrated in the same figure, in accordance with the present invention, the instruction set architecture (ISA) of a processor as given is analyzed in the step S101; the data required for generating test vectors are generated in the step S103 on the basis of the result of the analysis; and test vectors are generated in the step S105 on the basis of the data as generated. The function of the processor are then tested by running a simulation program with the test vectors as generated in an EWS(Engineering Work Station) in order to simulate the function of the processor under the test in the step S106; the design of the processor is logic synthesized in the step S107 after confirming the function; the circuit layout of the processor is generated by the use of the result of the logic synthesis in the step S108; masks are generated by the use of the circuit layout as generated in the step S109; and finally wafers are produced by the use of the masks as generated in the step S110.

The ISA specifications include specifications of addition instructions, branch instructions and so forth.

[Embodiment 1]

The first embodiment of the present invention will be explained in the case that test vectors for addition instructions are generated.

Figure 2:
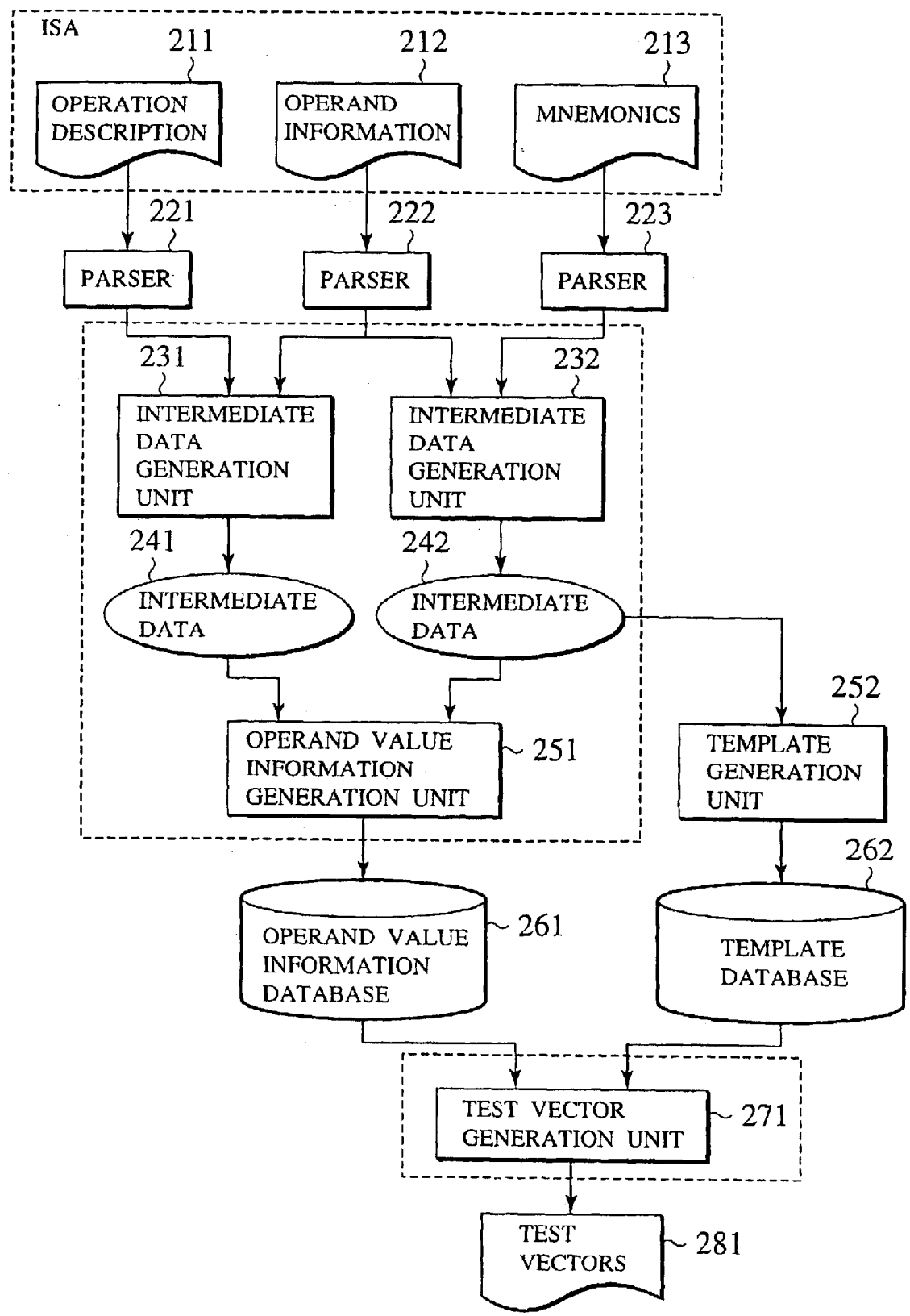
FIG. 2 is a block diagram showing an automatic test vector generating system in accordance with a first embodiment.

FIG. 2 is a block diagram showing an automatic test vector generating system in accordance with the first embodiment. As illustrated in the same figure, the automatic test vector generating system in accordance with the first embodiment is composed of parsers 221 to 223, intermediate data generation units 231 to 232, an operand value information generation unit 251, a template generation unit 252 and a test vector generation unit 271.

Operation description 211, operand information 212 and mnemonics 213 are input to the parsers 221 to 223 while the output of the parsers 221 to 223 are input to the intermediate data generation units 231 to 232. The intermediate data generation units 231 to 232 then output intermediate data items 241 and 242.

The intermediate data items 241 and 242 are input to the operand value information generation unit 251 while the intermediate data item 242 is input to the template generation unit 252.

The operand value information as generated by the operand value information generation unit 251 is then stored in an operand value information database 261 while the templates as generated by the template generation unit 252 are stored in a template database 262.

The operand value information and the templates are input to the test vector generation unit 271 in order to generate the test vectors 281.

FIG. 3 is a flowchart showing the procedure in accordance with the method of automatically generating test vectors of the first embodiment. As illustrated in the same figure, the operation description 211, the operand information 212 and the mnemonics 213 are input to the parsers 221 to 223 in the step S201. Next, the result of the analysis by the parsers 221 to 223 is input to the intermediate data generation units 231 to 232 in the step S203. The intermediate data generation unit 231 then generates the following inequality (1) while the intermediate data generation unit 232 generates the following inequalities (2) and (3) in the step S205. Next, the inequalities (1), (2) and (3) are input to the operand value information generation unit 251 while the inequalities (2) and (3) are input to the operand value information generation unit 252 in the step S207. The operand value information as obtained from the operand value information generation unit 251 is input to the operand value information database 261 while the templates as output from the template generation unit 252 are input to the template database 262 in the step S209. The operand value information and the templates are input to the test vector generation unit 271 in the step S211 in order to generate test vectors 281 in the step S213.

Examples of the operation description 211 and the mnemonics 213 are as follows.

```
[MNEMONIC]
ADD Rn,Rm
[OPERATION DESCRIPTION]
void
ADD(SINT32 Rn, SINT32 Rm)
{
    Rn = Rn+Rm;
}
```

Also, the operand information 212 is given to indicate that these registers are to store 32 bit signed integers. An overflow occurrs if the result of the execution exceeds out of the range from −2147483648 to +2147483647. If an arbitrary value is assigned to the operand Rn or Rm, an overflow may possibly occur in the result of the execution. For the purpose of avoiding an overflow, the values of the source operands have to be determined in order that the result of the execution satisfies the condition as described below.

$$-2147483648 \leq Rn+Rm \leq 2147483647 \tag{1}$$

The inequality (1) is derived from the operation description 211 to determine the values of the source operands while the following inequalities (2) and (3) are derived from the operand information 212 to determine the range of the operand values.

$$-2147483648 \leq Rn \leq 2147483647 \tag{2}$$

$$-2147483648 \leq Rm \leq 2147483647 \tag{3}$$

Meanwhile, the inequality (1) is given as the intermediate data item 241 while the inequalities (2) and (3) are given as the intermediate data item 242.

The inequalities (1), (2) and (3) are determined in this manner as a condition (exception avoiding condition) which the pair of the source operands must satisfy in order not to invoke an exception.

It is possible to determine the operand values which invoke no overflow by finding a solution of the three simultaneous inequalities by means of an appropriate tool for manipulating mathematical equations and expressions. The mathematics manipulation tool is implemented in the operand value information generation unit 251.

When expressed by an X-Y coordinate system, the ranges of Rn and Rm are represented by the boundary of and the inside of a convex hexagon as hatched (FIG. 4(A)) which is defined by the six vertices as follows.
D(2147483647, −2147483648), E(2147483647, 0), F(0, 2147483647), A(−2147483648, 2147483647), B(−2147483648, 0), C(0, −2147483648)

Outermost values as not invoking an overflow can be generated by obtaining the solution of the equations corresponding to the inequalities (1), (2) and (3) in which only the equal signs are taken into consideration. Namely, the outermost values correspond to the points located on the boundary of the convex hexagon having the above described six vertices. The x- and y-coordinates of the respective points are then stored in the operand value information database 261 as the operand value information.

Also, an option can be implemented to generate points in the neighborhood of the boundary of the convex hexagon (e.g., the outermost values as incremented by 1 or decremented by 1). The test can be concentrated in the neighborhood of the boundary by specifying this option in order to generate a large number of points in the neighborhood of the boundary.

For example, either one of Rn and Rm is incremented or decremented by 1 in the direction toward the origin from the point A (−2147483648,2147483647) to generate points (−2147483647,2147483647) and (−2147483648, 2147483646).

Next, either one of Rn and Rm is incremented or decremented by 1 in the direction toward the origin from these points to generate (−2147483646,2147483647), (−2147483647,2147483646) and (−2147483648, 2147483645).

A number of points in the neighborhood of the boundary can be generated by repeating this procedure starting with the respective outermost values.

The coordinates of points in the neighborhood of the boundary include the following values.

Only the least significant bit of a peripheral binary coordinate value is changed from "0" to "1" or from "1" to "0", for example, as from a peripheral binary coordinate value of [1000] to a peripheral binary coordinate value of [1001] or from a peripheral binary coordinate value of [1001] to a peripheral binary coordinate value of [1000].

While a plurality of bits of a peripheral binary coordinate value are changed from "1" to "0", only a single bit of a peripheral binary coordinate value is changed from "0" to "1", for example, as from a peripheral binary coordinate value of [0111] to a peripheral binary coordinate value of [1000].

While a plurality of bits of a peripheral binary coordinate value are changed from "0" to "1", only a single bit of a peripheral binary coordinate value is changed from "1" to "0", for example, as from a peripheral binary coordinate value of [1000] to a peripheral binary coordinate value of [0111].

Arbitrary one bit of a peripheral binary coordinate value is changed from "0" to "1" or from "1" to "0", for example, as from a peripheral binary coordinate value of [0110] to a peripheral binary coordinate value of [0010] or from a peripheral binary coordinate value of [0100] to a peripheral binary coordinate value of [0110].

Figure 4B:
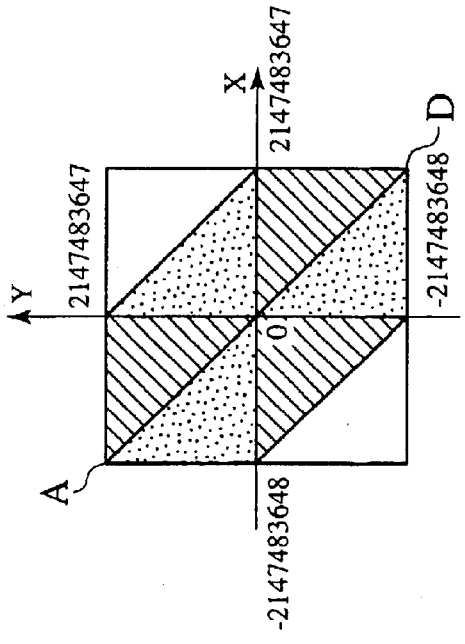
FIGS. 4a–4d are schematic views showing respective regions in which are located pairs of operand values invoking no exception in accordance with the first embodiment.

Points apart from the boundary can be generated by the following procedure. Namely, at the outset, the above described convex hexagon is divided into six triangles by the x-axis, the y-axis and a segment of the line passing through the point A and the point D as illustrated in FIG. 4(B).

Figure 4D:
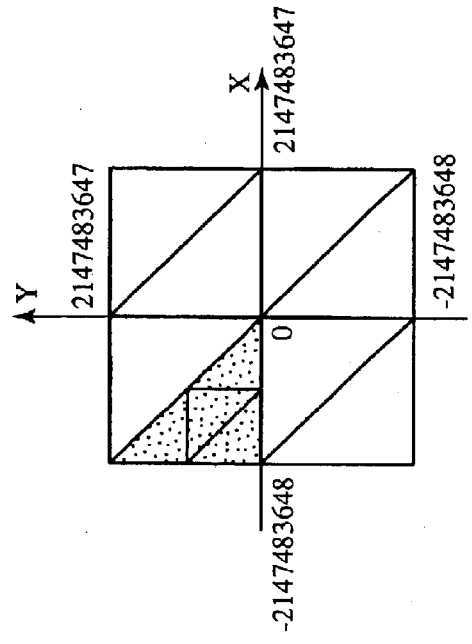

The coordinates of the barycenter of each triangle as divided are calculated as coordinates inside of the convex hexagon. For example, when calculating the barycenter of the triangle which has the point A, the point B and the origin as its vertices, the coordinates thereof are calculated as coordinates inside of the convex hexagon as illustrated in FIG. 4(C).

Furthermore, the respective triangle is divided into three triangles by the segments of the lines passing through the barycenter and the respective vertices of the triangle. The barycenters of the respective triangles as a result of the division are obtained again in the same manner. Coordinates inside of the convex hexagon can be uniformly obtained inside of the convex hexagon by repeating this procedure until a necessary number of coordinate pairs are obtained.

There are other procedures for the same purpose. For example, after generating the barycenter of the triangle, this triangle is divided into four triangles by means of three segment lines passing through the middle points of the respective sides as illustrated in FIG. 4(D). The triangle can be divided again by repeating this procedure. The coordinates of the inside of the convex hexagon can be obtained uniformly by obtaining the barycenters of the triangles as divided.

While the above description is provided for explaining the procedure to uniformly generate the coordinates of the inside of the convex hexagon, it is possible to selectively increase the number of the coordinates generated for a triangle(s), which is particularly desired to be investigated, by weighting the respective triangles as divided (for example with the number of the coordinates to be generated).

Pairs of the source operand values satisfying the exception avoiding condition are generated and stored in the operand value information database 261.

On the other hand, the intermediate data item 242 as obtained by analyzing the mnemonics 213 is input to the template generation unit 252, which then generate the templates (macros) of test vectors as in the followings and the templates are stored in the template database 262. Alternatively, the templates may be manually generated rather than by means of the template generation unit 252.

```
[TEMPLATE]
#define add_R2(Rn,Rm,Vn,Vm)
    MOV Rn,Vn // assigning Vn to Rn
    MOV Rm,Vm // assigning Vm to Rm
    ADD Rn,Rm // executing the instruction under test
```

This template is input to the test vector generation unit 271 together with pairs of the operand values in order to generate the test vectors 281.

For example, the following one test vector is obtained by expanding the above described template given two register numbers ($0,$5) and two values (123,234) as the arguments.

[TEST VECTOR]
MOV $0, 123
MOV $5, 234
ADD $0, $5

In this manner, test vectors are generated with arguments of a pair of the source operand values satisfying the exception avoiding condition.

Furthermore, there may be implemented an option of the test vector generation unit to switch a mode of generating a small number of test vectors in the neighborhood of the boundary and a mode of generating a large number of test vectors outside of the neighborhood of the boundary. By the use of the mode switching, it is possible to conduct the initial stages of the test with a small number of test vectors in the neighborhood of the boundary where a bug tends to be introduced, and after the test vectors in the neighborhood of the boundary successfully pass the test, to generate a large number of other test vectors. When the test vectors in the neighborhood of the boundary do not successfully pass the test, the generation of test vectors is terminated to reduce the test time.

If the above described addition operation does not satisfy the inequality (1), an overflow exception is to occur. Accordingly, an overflow exception occurs from the addition operation when either of the following two inequalities is satisfied.

$$-2147483648 > Rn+Rm \quad (10)$$

$$Rn+Rm > 2147483647 \quad (11)$$

Namely, the inequalities (10) and (11) constitute the condition to be satisfied by the pair of the source operand values for invoking an exception (the exception invoking condition).

Figure 4A:
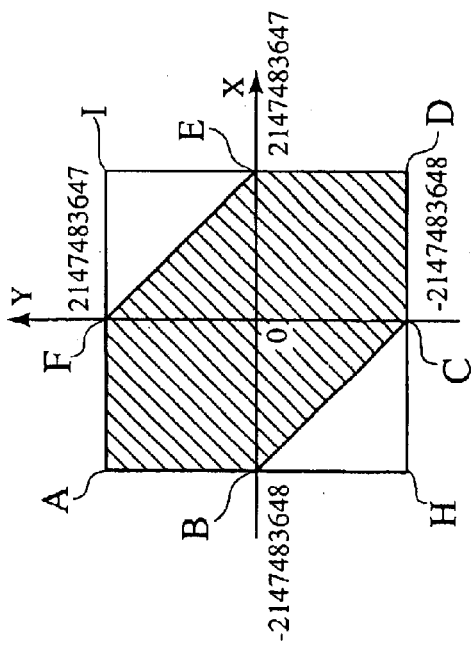
Figure 4C:
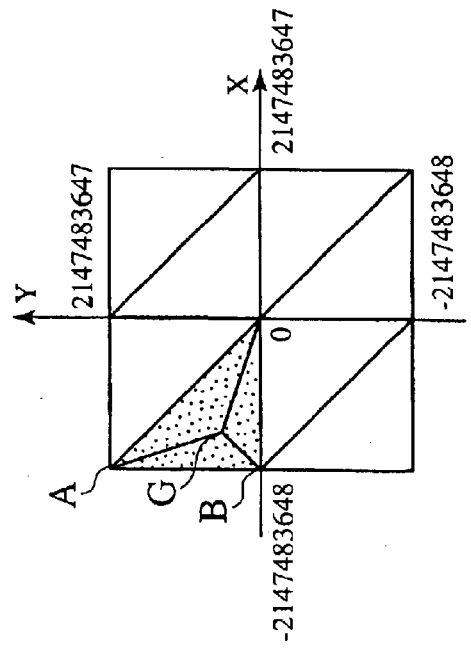

Pairs of the source operand values satisfying the exception invoking condition are generated by generating points inside of blank regions $\triangle$BCH and $\triangle$EFI and points on the sides BH, CH, EI and FI as illustrated in FIG. 4(A).

In the case that an exception is caused by an overflow, the control is transferred to a routine called the overflow exception handler which serves to handle the overflow exception in accordance with a predefined process and return the control to the next instruction subsequent to the instruction having invoked the overflow exception. The timely occurrence of an overflow exception is confirmed by designing the overflow exception handler to load a preselected value (for example, 0×1) to a preselected register (for example, $0) and checking the value loaded to the preselected register after returning to the next instruction from the overflow exception handler.

For example, the following instruction sequence is prepared in advance as an overflow exception handler.

[OVERFLOW EXCEPTION HANDLER]
  MOV $0,0×1
    RETI // the return instruction from the exception handler
        //An addition operation of 2147483647+1 is performed as an
        //operation invoking an overflow exception.
[TEST VECTOR]
  MOVH       // loading 0x7fff to the upper 16 bits of the register $2
  $2,0x7fff    // ORing the register $2 and 0x0000ffff -continued OR $2,0xffff   // and loading the result to the register $2
            // 0x7fffffff=2147483647 is then
            // assigned to the register $2.
MOV $3,0x1   // loading 0x1 to the register $3
ADD $2,$3     //calculating 2147483647+1
            //to be followed by an overflow exception:

When the instruction sequence is executed, an overflow exception is invoked by the ADD operation. 0×1 is loaded to the register $0 by the overflow exception handler returning to the next instruction followed by continuing the subsequent instructions.

[Embodiment 2]

The second embodiment of the present invention will be explained in the case that test vectors for branch instructions are generated.

Figure 5:
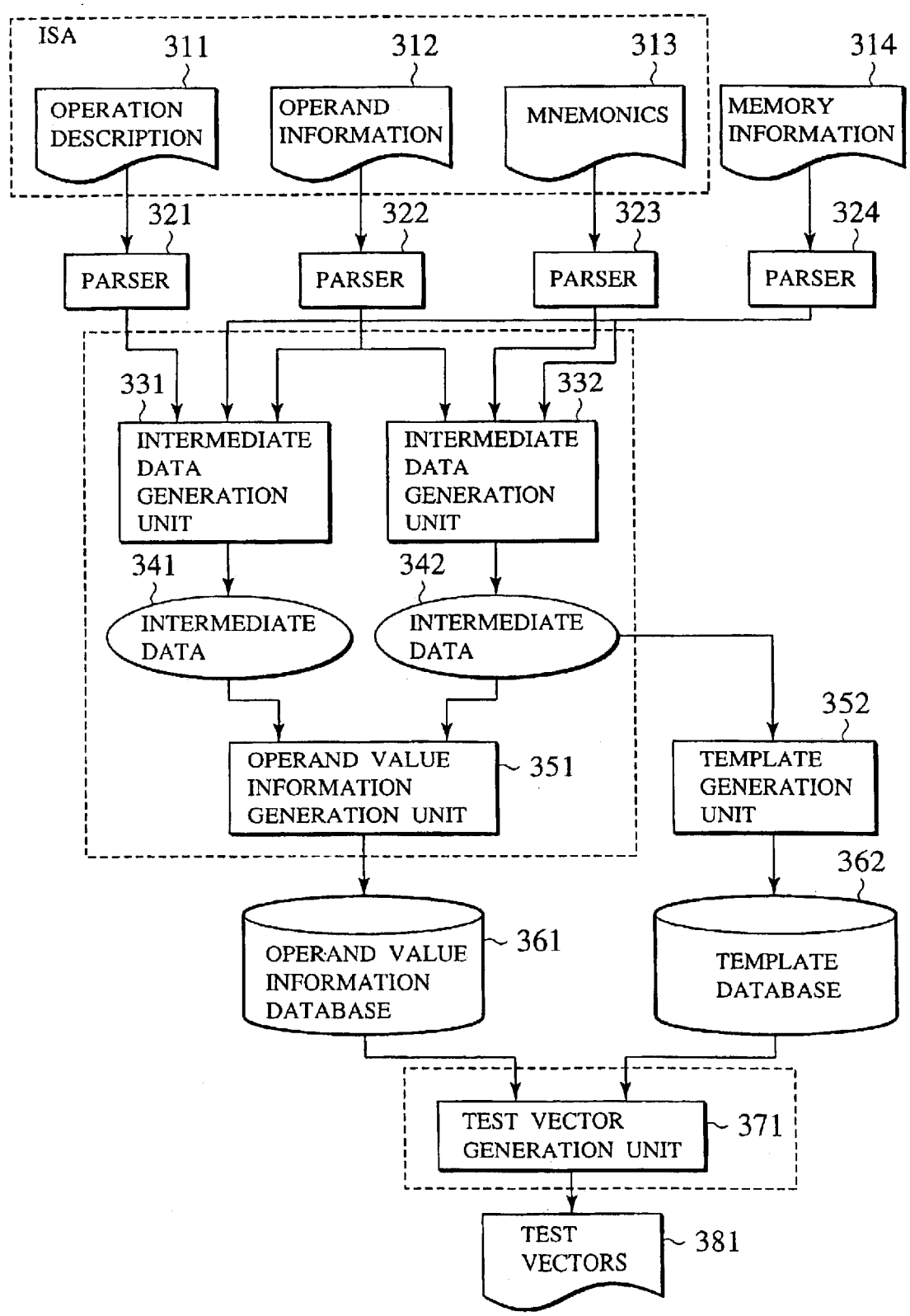
FIG. 5 is a block diagram showing an automatic test vector generating system in accordance with a second embodiment.

FIG. 5 is a block diagram showing an automatic test vector generating system in accordance with the second embodiment. As illustrated in the same figure, the automatic test vector generating system in accordance with the second embodiment is composed of parsers 321 to 324, intermediate data generation units 331 to 332, an operand value information generation unit 351, a template generation unit 352 and a test vector generation unit 371.

Operation description 311, operand information 312, mnemonics 313 and memory information 314 are input to the parsers 321 to 324 while the output of the parsers 321 to 324 are input to the intermediate data generation units 331 to 332. The intermediate data generation units 331 and 332 output intermediate data items 341 and 342. The intermediate data items 341 and 342 are then input to the operand value information generation unit 351 while the intermediate data item 342 is input to the template generation unit 352. The operand value information as generated by the operand value information generation unit 351 is stored in an operand value information database .361 while the templates as generated by the template generation unit 352 are stored in a template database 362. The operand value information and the templates are input to the test vector generation unit 371 in order to generate the test vectors 381.

FIG. 6 is a flowchart showing the procedure in accordance with the method of automatically generating test vectors of the second embodiment. As illustrated in the same figure, the operation description 311, the operand information 312, the mnemonics 313 and the memory information 314 are input to the parsers 321 to 324 in the step S301. Next, the result of the analysis by the parsers 321 to 324 is input to the intermediate data generation units 331 to 332 in the step S303. The intermediate data generation unit 331 then generates the following inequalities (5), (6), (7) and (8) while the intermediate data generation unit 332 generates the following inequality (4) in the step S305. Next, the inequalities (4), (5), (6), (7) and (8) are input to the operand value information generation unit 351 while the inequality (4) is input to the operand value information generation unit 352 in the step S307. The operand value information as obtained from the operand value information generation unit 351 is input to the operand value information database 361 while the templates as output from the template generation unit 352 are input to the template database 362 in the step S309. The operand value information and the templates are input to the test vector generation unit 371 in the step S311 in order to generate test vectors 381 in the step S313.

Examples of the operation description 311 and the mnemonics 313 are as follows. In the source code, "PC" is the program counter; and "disp8" is the displacement.

[MNEMONIC]
BEQ Rn, Rm, disp8
[OPERATION DESCRIPTION]
void
BEQ(SINT32 Rn, SINT32 Rm, SINT8 disp8, SINT PC)
{
    if (Rn==Rm){
        PC = PC+disp8;
    }
    else{
        PC = PC+4;
    }
}

The condition required of values assigned to the operand "PC" and the operand "disp8" is such that each of PC and PC+disp8 points to an address within a code segment. The information about the code segment is obtained from the memory information 314. If the code segment is [0×800000, 0×900000], the operand "PC" and the operand "disp8" have to satisfy the following inequality (4) from which the range of the operand "disp8" is generated as the following inequality (5) with reference to the operand information 312. The values of the operand "PC" and the operand "disp8" are arbitrarily selected from the group of the solutions of the inequality. In the inequality, the operand "disp8" is a 8-bit singed operand.

$$0\times800000 \leq PC \leq 0\times900000$$

$$0\times800000 \leq PC+disp8 \leq 0\times900000 \quad (4)$$

$$-128 \leq disp8 \leq 127 \quad (5)$$

Figure 7A:
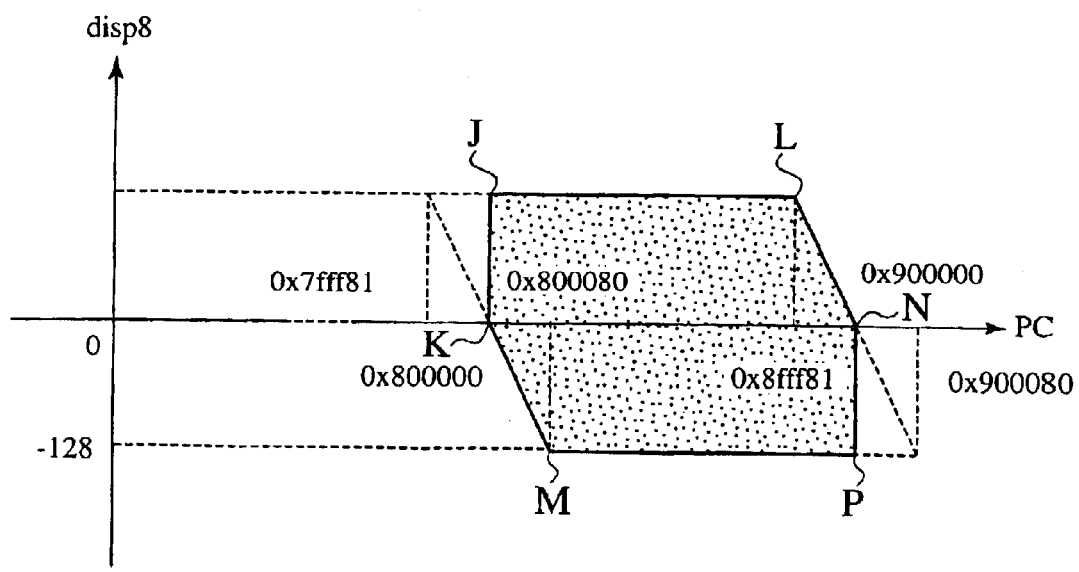
FIG. 7 is a schematic view showing the region in which are located pairs of a program counter value and a displacement invoking no exception in accordance with the second embodiment.

The solutions of the three simultaneous inequalities are represented as illustrated in FIG. 7(A) by a hexagon defined by the six vertices as follows.
J(0×800000, 127), K(0×800000, 0), L(0×8fff81, 127), M(0×800080, −128), N(0×900000, 0) and P(0×900000, −128)

Points in the neighborhood of the boundary of the hexagon and points on the boundary of the hexagon are generated in the same manner as the embodiment 1. For example, the hexagon is divided into four triangles by the segment of the line between K(0×800000,0) and L(0×8fff81,127), the segment of the line between M(0×800080,−128) and N(0×900000,0) and the segment of the line between K(0×800000, 0) and N(0×900000,0). The coordinates inside of the hexagon can be obtained in the same manner as the embodiment 1 as addresses which invoke no exception.

Next, while an option is implemented to specify whether the conditional expression is to be TRUE or to be FALSE, the operand values assigned to the conditional expression can be generated (1) as values satisfying Rn==Rm by analyzing the operation description 311 in the case of TRUE, (2) as values satisfying Rn!=Rm by analyzing the operation description 311 in the case of FALSE or (3) as values corresponding to both the cases of TRUE and FALSE when not specified.

Figure 7B:
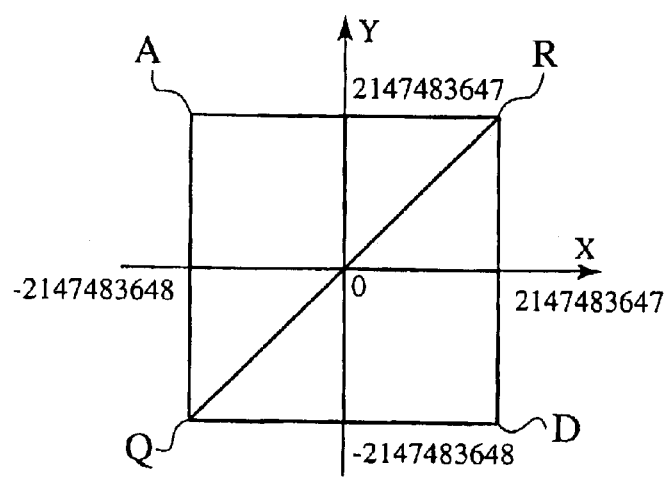
Figure 8:
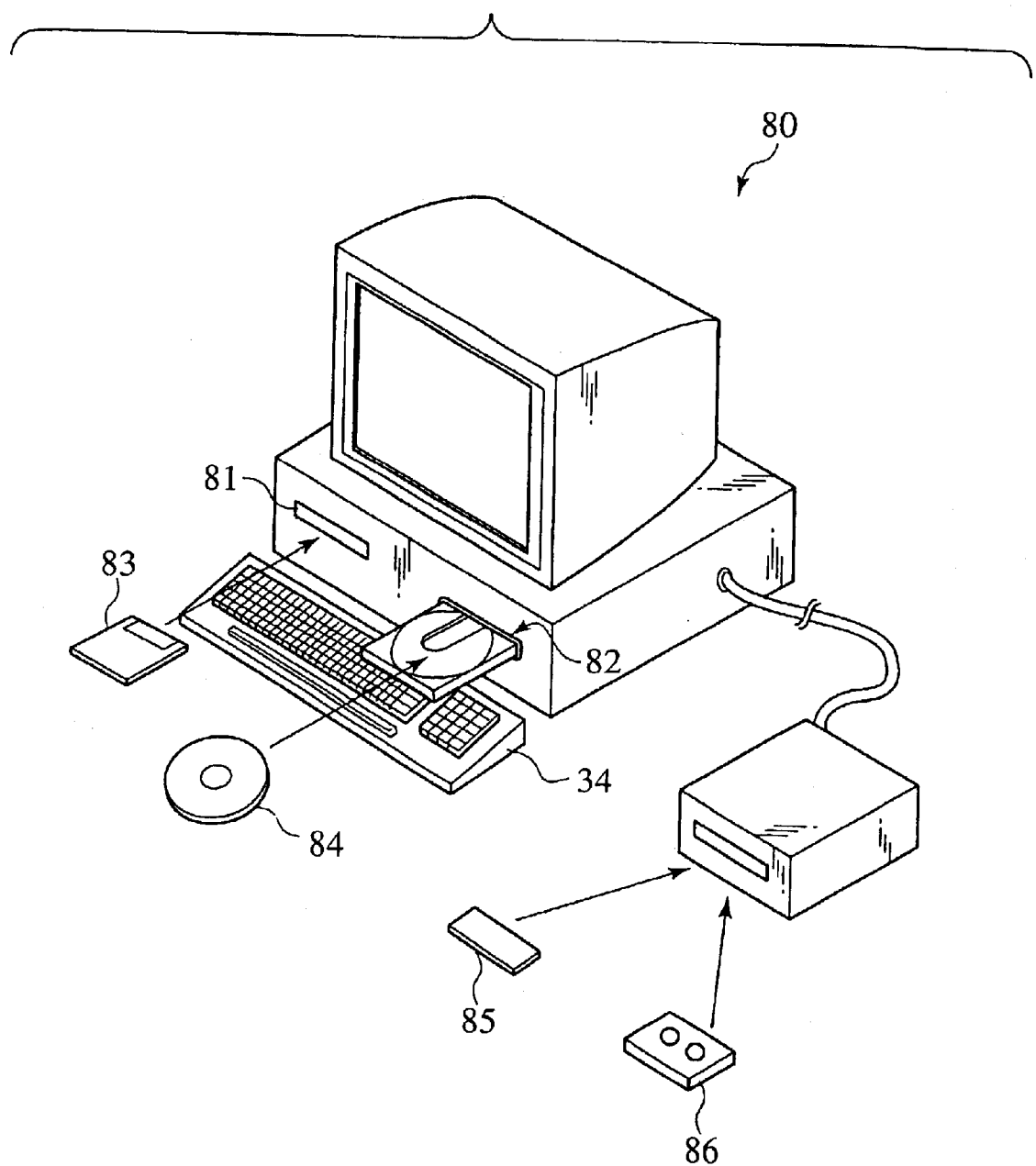
FIG. 8 is a schematic view for explaining an automatic test vector generation program as embodied on a computer readable medium in accordance with an embodiment of the present invention.

More specifically explaining, the values satisfying Rn==Rm are generated by generating the inequality (6) of Rn=Rm from Rn==Rm, generating the inequalities (2) and (3) from the operand information 312, and obtaining the segment of the line between Q(−2147483648,−2147483648) and R(2147483647,2147483647) as the solution of the three simultaneous inequalities (2), (3) and (6) as illustrated in FIG. 7(B). Pairs of the values satisfying the conditional expression can be obtained by generating the coordinates on the segment of the line.

In addition to this, pairs of operand values in the neighborhood of the boundary can be generated by varying the boundary values by 1 within the possible range of the respective operands in the direction of the x- or y-coordinates. On the other hand, the values satisfying Rn!=Rm are generated by generating the inequalities (7) and (8), i.e., $$Rn<Rm \quad (7)$$

$$Rn>Rm \quad (8),$$

and obtaining a triangle defined by the three vertices, A(−2147483648, 2147483647), Q(−2147483648, −2147483648) and R(2147483647, 2147483647), as the solution of the three simultaneous inequalities (2), (3) and (7) as illustrated in FIG. 7(B).

Also, the solution of the three simultaneous inequalities (2), (3) and (8) is a triangle defined by the three vertices, D(2147483647, −2147483648), Q(−2147483648, −2147483648) and R(2147483647, 2147483647) as illustrated in FIG. 7(B).

The range of the pairs of values satisfying Rn!=Rm is the inside of the two triangles and the boundary of the two triangles except for the segment of the line between Q(−2147483648, −2147483648) and R(2147483647, 2147483647).

The pairs of the operand values as generated in this manner are stored in the operand value information database 361.

On the other hand, the template generation unit 352 receives the intermediate data item 342 as obtained by analyzing the operand information 312, the mnemonics 313 and the memory information 314 and generate the following template for test vectors, which is stored in the template database 362. Meanwhile, the templates may be manually generated rather than by means of the template generation unit 352 in the same manner as the first embodiment.

[TEMPLATE]
define beq_R2(Rn,Rm,Rc,Vn,Vm)
    MOV Rn,Vn    // assigning Vn to Rn
    MOV Rm,Vm    // assigning Vm to Rm
    BEQ Rn,Rm,BranchLabel // executing the instruction under test
    MOV Rc,0x0    // assigning 0x0 to Rc
    JMP JumpLabel
BranchLabel:
    MOV Rc,0x1    // assigning 0x1 to Rc
JumpLabel:

The test vectors 381 are generated by inputting the template to the test vector generation unit 371 together with the pairs of the operand values as stored in the operand value information database 361.

For example, the following one test vector is obtained by expanding the above described template given three register numbers ($0, $5, $8) and two values (123,234) as the arguments.

[TEST VECTOR]
    MOV $0,123 // assigning Vn to Rn
    MOV $5,234 // assigning Vm to Rm
    BEQ $0,$5,BranchLabel // executing the instruction under test
    MOV $8,0x0 // assigning 0x0 to Rc
    JMP JumpLabel Furthermore, when the operand values are generated for a conditional expression, it may be confirmed that the conditional expression is always TRUE or always FALSE as a result of analyzing, by a mathematics manipulation tool, the simultaneous inequalities introduced from the conditional expression and the operand information appearing in the conditional expression.

For example, it is assumed that an instruction is defined by the following mnemonic and the following operation description.

```
[MNEMONIC]
BCND3 Rl, Rm, Rn, disp8
[OPERATION DESCRIPTION]
void
BCND3(SINT32 Rl, SINT32 Rm, SINT32 Rn, SINT8 disp8, SINT PC)
{
  if ((Rl < Rm) && (Rm < Rn) && (Rn < Rl)) {
    PC = PC + disp8;
  } else {
    PC = PC + 4;
  }
}
```

The conditional expression of the branch instruction has no solution so that it is always FALSE.

If the solutions of the conditional expression are all the combinations of the operand values throughout the entirely of the ranges of the operand values, conversely, it will be understood that it is always TRUE.

```
[MNEMONIC]
BCND Rn, Rn, disp8
[OPERATION DESCRIPTION]
void
BCND(SINT32 Rn, SINT8 disp8, SINT PC)
{
  if (Rn == Rn) {
    PC = PC + disp8;
  } else {
    PC = PC + 4;
  }
}
```

The conditional expression of the branch instruction covers all the range of Rn so that it is always TRUE.

It is therefore possible to detect a bug in the ISA specifications by providing an analysis tool serving to analyze a conditional expression in order to confirm if the conditional expression can inherently not be TRUE or can inherently not be FALSE.

[Embodiment 3]

The third embodiment of the present invention will be explained in the case that a self-checking mechanism is implemented.

The operation of each instruction under test is defined as a function in the C++ language. The expected value is generated by the use of the function. In this case, the expected value is the value which the processor under test has to output as a result of the operation of the instruction when correctly operated. The actual output value of the processor under test is compared with the expected value. The comparison of the expected value with the actual output value is possible by the use of the following macro.

```
// EXPECTED VALUE COMPARISON MACRO
//
// REG0 : The register storing the result of the execution for comparison
// REG1 : The register storing the expected value
// EXP : The expected value
#define COMPARE(REG0,REG1,EXP)
MOV REG1, EXP
BNE REG0, REG1, FAIL
```

For example, when the two input values "10" and "20" are input to the expected value generation program for an addition instruction, "30" is obtained as the expected value thereof. The expected value is compared with the actual output value of the processor under test (the result of the execution to be compared) by the use of the expected value comparison macro. The register REG0 is the register which is designated by the expected value comparison macro and serves to store the result of the execution to be compared. The register REG1 is temporalily used so that it can be a register whose content may be destructed. The expected value as generated is assigned to the register EXP. In the case that it is desired to repeat the expected value comparison for one instruction using a plurality of registers, the expected value comparison macro is repeatedly implemented for the respective registers.

[Embodiment 4]

The fourth embodiment of the present invention will be explained in the case that the times required for executing the respective test vectors are estimated.

It is possible to calculate the number of instructions to be actually executed in the respective simulator for executing a test vector as generated in accordance with the present invention by counting and accurately determining the number of instructions of the test vector. Accordingly, it is possible to estimate the time required for executing each test vector. For example, it is assumed that an instruction sequence is defined as a test vector as follows.

```
if (cond) then
        an instruction;
else
        an instruction;
        :
        an instruction;
end if
```

In the case of test vectors as generated in accordance with the present invention, the Boolean value of the conditional expression is uniquely preselected. Namely, it can be determined for what times the "then" clause is repeated and for what times the "else" clause is repeated. Accordingly, the number of instructions to be executed can be accurately counted by the following expression (9) and therefore the estimation of the time required for executing test vectors becomes possible.

$$\text{(number of instructions in the ''then'' clause)} * \tag{9}$$
$$\text{(frequency of executing the ''then'' clause)} +$$
$$\text{(number of instructions in the ''else'' clause)} *$$
$$\text{(frequency of executing the ''else'' clause)}$$

A software provided for implementing the above described steps are stored in a magnetic storage medium such as a floppy disk 83 or a cassette tape 86, an optical disk such as a CD-ROM 84, or any other computer-readable medium such as ROM 85. In this case, the software can be installed or backed up by inserting the storage medium storing the software into a floppy disk drive 81, a CD-ROM drive 82 and so forth of the computer system 80.

In accordance with the storage medium storing such a program, it is possible to preserve, run and transport the program for automatically generating test vectors from the ISA specifications without difficulty.

As explained above, in accordance with the present invention, it is possible to obtain necessary data required for automatically generating test vectors from the instruction set architecture (ISA) and therefore to automatically generate test vectors.

Also, it is possible to automatically generate operand values which invoke no exception handler such as an overflow exception processing sequence and therefore generate test vectors for testing the operation of a respective instruction itself.

Furthermore, it is possible to generate operand values for invoking an exception and therefore generate test vectors used for confirming an exception.

Furthermore, it is possible to detect a bug in the ISA specifications by analyzing a conditional expression involved in the execution in order to confirm if the conditional expression can inherently not be TRUE or can inherently not be FALSE.

Furthermore, it is possible to test the circuit on the register transfer level (RTL) even without an instruction level simulator by providing each test vector with a self-checking mechanism.

Furthermore, it is possible to specifically count the number of steps for executing a test vector and therefore improve the accuracy of the estimated execution time of the test vector.

Furthermore, it becomes convenient and speedy to preserve, run and transport the program for implementing the method as described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor chip manufacturing method, comprising:

analyzing specifications of an ISA of a processor;

preparing data required for generating test vectors by use of a result of the analyzing;

generating test vectors by use of the data;

testing operations of the processor as simulated by a simulator program with the test vectors;

synthesizing a logic of the processor having been tested;

generating a layout by use of a result of the synthesizing;

generating a mask by use of a result of the layout; and generating a wafer by use of the mask, wherein the generating of the test vectors comprises:

determining an exception avoiding condition which a set of source error avoiding operands must satisfy in order to avoid invoking an exception of a processor under test by use of operand information, an operation description, and mnemonics;

determining an exception avoiding region comprising the set of the source error avoiding operands; and obtaining from the exception avoiding region a plurality of source error avoiding operand values close to an exception invoking region comprising a set of source error.

2. The semiconductor chip manufacturing method of claim 1, wherein the obtaining of the plurality of source error avoiding operand values comprises:

inverting at least one of the respective bits constituting a bit sequence as a binary expression of a source error avoiding operand value as obtained from "0" to "1" or from "1" to "0".

3. A semiconductor chip manufacturing method, comprising:

analyzing specifications of an ISA of a processor;

preparing data required for generating test vectors by use of a result of the analyzing;

generating test vectors by use of the data;

testing operations of the processor as simulated by a simulator program with the test vectors; synthesizing a logic of the processor having been tested;

generating a layout by use of a result of the synthesizing;

generating a mask by use of a result of the layout; and generating a wafer by use of the mask, wherein the generating of the test vectors comprises:

determining an exception avoiding condition which a set of source error avoiding operands must satisfy in order to avoid invoking an exception of a processor under test by use of operand information, an operation description, and mnemonics;

determining an exception avoiding region comprising the set of the source error avoiding operands;

dividing the exception avoiding region into a plurality of exception avoiding divided regions; and obtaining sets of the source error avoiding operand values from the plurality of exception avoiding divided regions.

4. The semiconductor chip manufacturing method of claim 3, wherein the dividing of the exception avoiding region comprises:

dividing the exception avoiding region into a plurality of exception avoiding divided regions with equal areas.

5. The semiconductor chip manufacturing method of claim 4, wherein the dividing of the exception avoiding region comprises:

dividing the exception avoiding region into a plurality of triangles with equal areas; and dividing each of the triangles into four areas with three lines passing respectively through a triangle middle point.

6. The semiconductor chip manufacturing method of claim 4, wherein the dividing of the exception avoiding region comprises:

dividing the exception avoiding region into a plurality of triangles with equal areas; and dividing each of the triangles by three with three lines connecting a triangle barycenter and respective triangle vertices.

7. A semiconductor chin manufacturing method, comprising:

analyzing specifications of an ISA of a processor;

preparing data required for generating test vectors by use of a result of the analyzing;

generating test vectors by use of the data;

testing operations of the processor as simulated by a simulator program with the test vectors;

synthesizing a logic of the processor having been tested;
generating a layout by use of a result of the synthesizing;
generating a mask by use of a result of the layout; and
generating a wafer by use of the mask, wherein the generating of the test vectors comprises:
  determining an exception invoking condition which a set of source error invoking operands must satisfy in order to invoke an exception of a processor under test by use of operand information, an operand description, and mnemonics;
  determining an exception invoking region comprising the set of the source error invoking operands; and
  obtaining from the exception invoking region a plurality of source error invoking operand values close to an exception avoiding region comprising a set of source error avoiding operands.

8. The semiconductor chip manufacturing method of claim 7, wherein the obtaining of the plurality of source error invoking operand values comprises:
  inverting at least one of the respective bits constituting a bit sequence as a binary expression of a source error invoking operand value as obtained from "0" to "1" or from "1" to "0".

9. A semiconductor chip manufacturing method, comprising:
  analyzing specifications of an ISA of a processor;
  preparing data required for generating test vectors by use of a result of the analyzing;
  generating test vectors by use of the data;
  testing operations of the processor as simulated by a simulator program with the test synthesizing a logic of the processor having been tested;
  generating a layout by use of a result of the synthesizing;
  generating a mask by use of a result of the layout; and
  generating a wafer by use of the mask, wherein the generating of the test vectors comprises:
    determining an exception invoking condition which a set of source error invoking operands must satisfy in order to invoke an exception of a processor under test by use of operand information, an operation description, and mnemonics;
    determining an exception invoking region comprising the set of the source error invoking operands;
    dividing the exception invoking region into a plurality of exception invoking divided regions; and
    obtaining sets of the source error invoking operand values from the plurality of exception invoking divided regions.

10. The semiconductor chip manufacturing method of claim 9, wherein the dividing of the exception invoking region comprises:
  dividing the exception invoking region into a plurality of exception invoking divided regions with equal areas.

11. The semiconductor chip manufacturing method of claim 10, wherein the dividing of the exception invoking region comprises:
  dividing the exception invoking region into a plurality of triangles with equal areas; and
  dividing each of the triangles by four with three lines passing respectively through a triangle middle point.

12. The semiconductor chip manufacturing method of claim 10, wherein the dividing of the exception invoking region comprises:
  dividing the exception invoking region into a plurality of triangles with equal areas; and
  dividing each of the triangles by three with three lines connecting a triangle barycenter and respective triangle vertices.

* * * * *